United States Patent
Tajiri

(10) Patent No.: US 6,869,182 B2
(45) Date of Patent: Mar. 22, 2005

(54) FRAME AND LENS SYSTEM

(76) Inventor: Akira Tajiri, 1630 11th St., Reedley, CA (US) 93654

( * ) Notice: Subject to any disclaimer, the term of this patent is extended or adjusted under 35 U.S.C. 154(b) by 0 days.

(21) Appl. No.: 10/735,791

(22) Filed: Dec. 11, 2003

(65) Prior Publication Data
US 2004/0125340 A1 Jul. 1, 2004

Related U.S. Application Data
(60) Provisional application No. 60/432,970, filed on Dec. 11, 2002.

(51) Int. Cl.⁷ .................................................. A61B 2/10
(52) U.S. Cl. ....................................... 351/204; 351/218
(58) Field of Search ................................. 351/204, 205, 351/218, 200

(56) References Cited

U.S. PATENT DOCUMENTS

| | | |
|---|---|---|
| 1,386,046 A | 8/1921 | Bishop |
| 3,565,517 A | 2/1971 | Gitlin et al. |
| 4,448,501 A | 5/1984 | Cogez |
| 4,846,913 A | 7/1989 | Frieder et al. |
| 4,997,267 A | 3/1991 | Morrison et al. |
| 5,459,534 A | 10/1995 | Morrison |
| 5,523,805 A | 6/1996 | Kuipers et al. |
| 5,694,194 A | 12/1997 | Morrison |
| 5,790,227 A | 8/1998 | Rorabaugh |
| 5,793,468 A * | 8/1998 | Shalon et al. ............... 351/218 |
| 5,880,805 A | 3/1999 | Naessens et al. |
| 5,997,137 A | 12/1999 | MacIntosh, Jr. |
| 6,183,081 B1 | 2/2001 | Ono et al. |
| 6,286,957 B1 * | 9/2001 | Livnat ........................ 351/204 |

* cited by examiner

Primary Examiner—Hung Xuan Dang
(74) Attorney, Agent, or Firm—Scott R. Hansen; Fulwider Patton Lee & Utecht, LLP

(57) ABSTRACT

A method for mass manufacturing of eye glasses includes steps of measuring the interpupillary distance of each eye; measuring the refractive error of each eye with a hand-held auto refractor; selecting a lens blank for each eye from among a stock of lenses; cutting a lens blank for each eye; and mounting the cut lens blanks onto a standardized eyeglasses frame.

15 Claims, 4 Drawing Sheets

FRAME AND LENS SYSTEM

RELATED APPLICATION

This application claims priority from U.S. Provisional Patent Application Ser. No. 60/432,970, which was filed Dec. 11, 2002 and which this application incorporates by reference.

BACKGROUND OF THE INVENTION

1. Field of the Invention:

The present invention relates to glasses and, in particular, to a frame and lens system for making eyeglasses in remote areas.

2. General Background and State of the Art:

Millions of people throughout the world require corrective lenses in order to see properly. However, it is difficult to distribute glasses to people who need them. In particular, it can be very difficult to match the proper eyeglasses to the prescription that a particular person requires. Some charitable organizations gather large numbers of pairs of glasses, and attempt to match the glasses to particular individuals. The prescription is rarely precise, however, largely because user's often require different lenses for each eye. The end user therefore often ends up with the wrong prescription.

Various attempts have been made to provide mass-distribution eyeglasses. U.S. Pat. No. 3,565,517 to Gitlin et al. discloses a spectacle frame having removable lenses. The lenses must have a rim of a specific geometry in order to fit into the frame. U.S. Pat. No. 4,997,267 to Morrison et al. discloses a universal eyeglass frame to which can be fitted a variety of lenses. The lenses must have a special nub in order to fit into the frame.

U.S. Pat. No. 5,459,534 to Morrison discloses an eyeglass frame having two adjustable lens receiving portions. U.S. Pat. No. 5,523,805 to Kuipers et al. discloses an eyeglass frame that receives a specially-cut lens. U.S. Pat. No. 5,790,227 to Rorabaugh discloses a frame that receives a lens having a special protrusion.

INVENTION SUMMARY

A method of fabricating eye glasses includes several steps. The interpupillary distance of each eye is measured. The refractive error of each eye is measured with a hand-held auto refractor. A lens blank is selected for each eye from among a stock of lenses. A lens blank for each eye is cut. The cut lens blanks are mounted onto an eyeglasses frame.

The method may include specific additional steps. A bifocal segment may be applied to both of the lenses. The bifocal segment may be applied to the lenses by use of capillary attraction, or by other means, such as glue. The interpupillary distance may be measured with a simple P.D. rule. The lenses may be mounted onto the frame with glue, or with two sided tape. The refractive error of each eye may be measured with a hand-held autorefractor. The lenses may be marked with a protractor prior to cutting.

The invention is not limited by this Summary, but is further defined with reference to the Brief Description of the Drawings, the Specification, and claims.

DETAILED DESCRIPTION OF THE PREFERRED EMBODIMENTS

The invention relates to a quick fabrication method to make precise, accurate spectacle lenses for each eye. The system is primarily designed for mass prescribing of glasses, in the Third World, for example. People in the Third World who have uncorrected vision typically have a life-long inability to see properly or at all. With proper spectacle lenses, they will be able to have gainful employment, and the improved vision will generally enrich their lives. Proper spectacles will also relieve the asthenopia (such as headache, eye strain, etc.) that is often associated with uncorrected vision.

Each pair of glasses is designed specifically for each individual and specifically for each eye. The correction may be for nearsightedness, farsightedness, and/or astigmatism, as well as for bifocals, when necessary. The system may typically be implemented in a few minutes.

Figure 1:
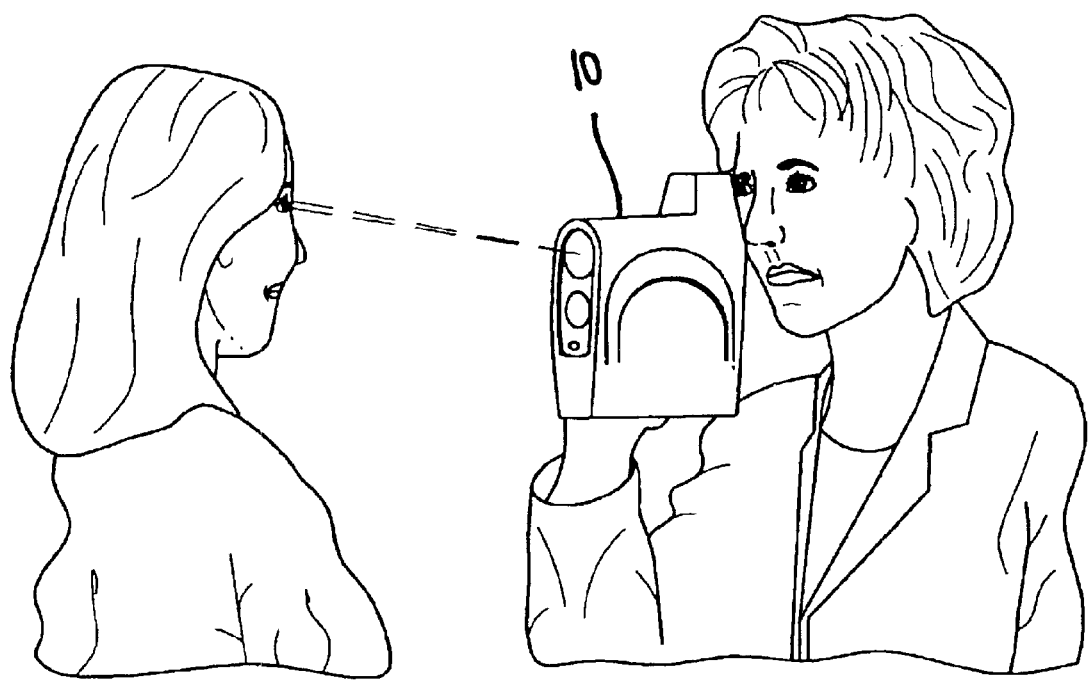
FIG. 1 illustrates measuring the refractive error of each eye using a hand-held auto refractor.

FIG. 1 illustrates measuring the refractive error of each eye using a hand-held auto refractor 10. Hand-held auto refractors are widely available and require relatively little training to use. The auto refractor 10 is typically powered by one or more batteries, and constitute the only component of the system that requires an electrical power source. Each of the patient's eyes is refracted to measure the proper prescription. The data is then printed out. Alternatively, a retinoscope may be used, although much more training is typically required.

Figure 2:
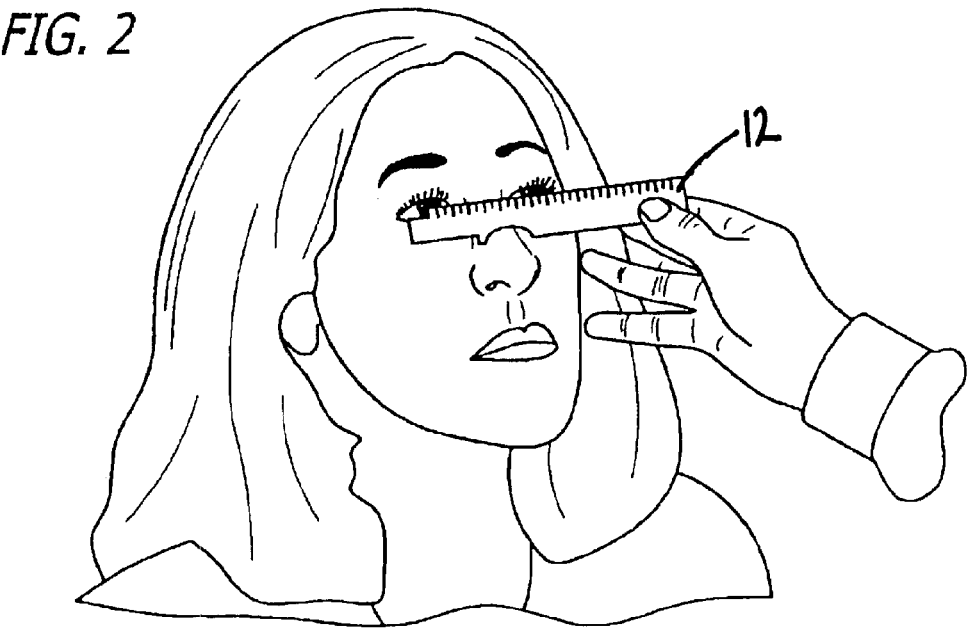
FIG. 2 illustrates measuring the interpupillary distance utilizing a simple P.D. rule.

FIG. 2 illustrates measuring the interpupillary distance utilizing a simple P.D. rule 12. The technician requires minimal training in order to measure the interpupillary distance.

Figure 3A:
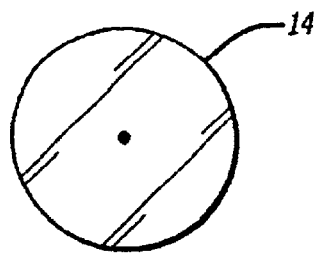
FIG. 3A illustrates a spherical lens selected from a stock of lenses.

FIG. 3A illustrates a spherical lens 14 selected from a stock of lens blanks. Although the lens is shown as a fully-round lens, in practice the lens may be pre-cast such that the upper portion is removed (see, for example, reference numeral 14" in FIG. 9). In one embodiment, the lenses are precast to 44 mm round. The spheres can be cast in the truncated form (see FIG. 9), which results in a more aesthetically pleasing lens that a lens that is hand-cut with a saw. In one embodiment, it should be mentioned that the minimum lens thickness is 2 mm at the thinnest point, although this may differ for different lenses.

Figure 3B:
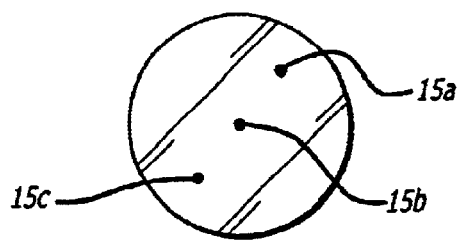
FIG. 3B illustrates a sphero cylindrical lens of a desired power selected from a stock of lenses.

Referring to FIG. 3B, the lens may be another type of lens, such as a sphero cylinder. In the case of a sphero cylinder, the lens must be marked and cut. The technician selects the proper power lens from among the stock of lenses. Each lens is pre-marked with three dots 15a, b, c, or some other means for marking an axis. The sphero cylinder is used to correct astigmatism.

With the type of lens illustrated in FIG. 3B, the correction for astigmatism relates to a cylinder. The axis of the particular lens, as determined by the prescription generated at the step of using the auto-refractor, is marked by three dots.

With respect to the sphero cylindrical lenses, in one embodiment all of the lenses are prefinished to a 44 mm diameter. This aids in making the fabrication efficient and rapid. If the lens is spherical, the lens will typically already have the top portion removed, saving the time needed to cut it off with a saw.

Figure 4:
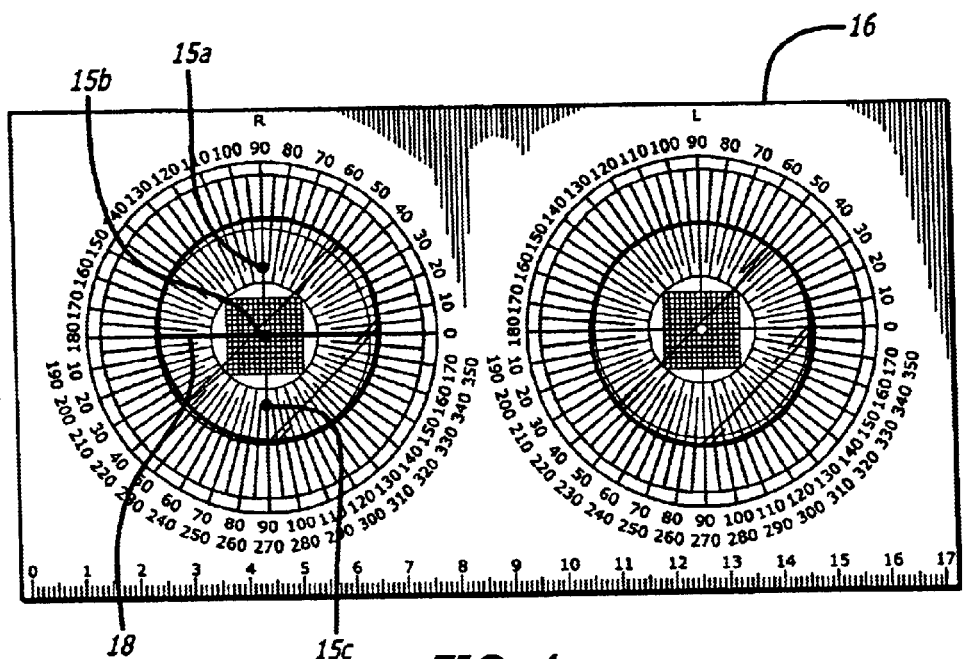
FIG. 4 illustrates a protractor with which a technician marks a line on the lens at 180 degrees indicating where the lens should be aligned to cut and maintaining the proper axis of the correction for astigmatism.

In selecting the proper power lens, the technician may, for example, if the prescription for the right eye is −1.00−1.25 axis 90, remove a stock lens of −1.00−1.25 is from the stock of lenses. The axis of the lens as marked by the three dots or other indicia is placed on the compass. The lens is turned on the protractor to the axis, which has been determined as a prescription by the auto-refractor. In the example of FIG. 4, the prescribed lens has an axis of 90, and the three dots on the lens are placed at the 90 degree mark on the protractor. The 180 degree line is drawn across the lens at the 180 degree line on the protractor. FIG. 4 illustrates a protractor 16 with which a technician has marked a line 18 at the 180 degree point. This 180 degree line will be lined up with a mark in the miter box to determine how the lens is to be cut by a hand saw (or other cutting device).

Stock lenses are well-known in the art and are widely available. On the lens of FIG. 4, the three dots are lined up at 90 degrees on the protractor, because the prescription for that particular lens calls for a 90 degree axis. This axis can be different for different prescriptions, however. A line is drawn across the lens at the 180 degree line, to form the line 18. The line 18 will later be lined up along a line or marking on a miter box for cutting the lens.

Figure 5:
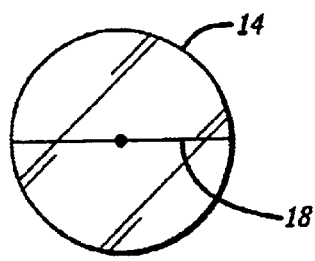
FIG. 5 illustrates a lens blank onto which a 180 degree line has been drawn.

FIG. 5 illustrates a lens blank onto which a 180 degree line 18 has been drawn across the middle portion of the lens. This 180 degree line is lined up with a mark in the miter box, which puts the line to be cut across the top of the lens immediately across a slot in the mitre box at which a blade will cut across the lens.

Figure 6B:
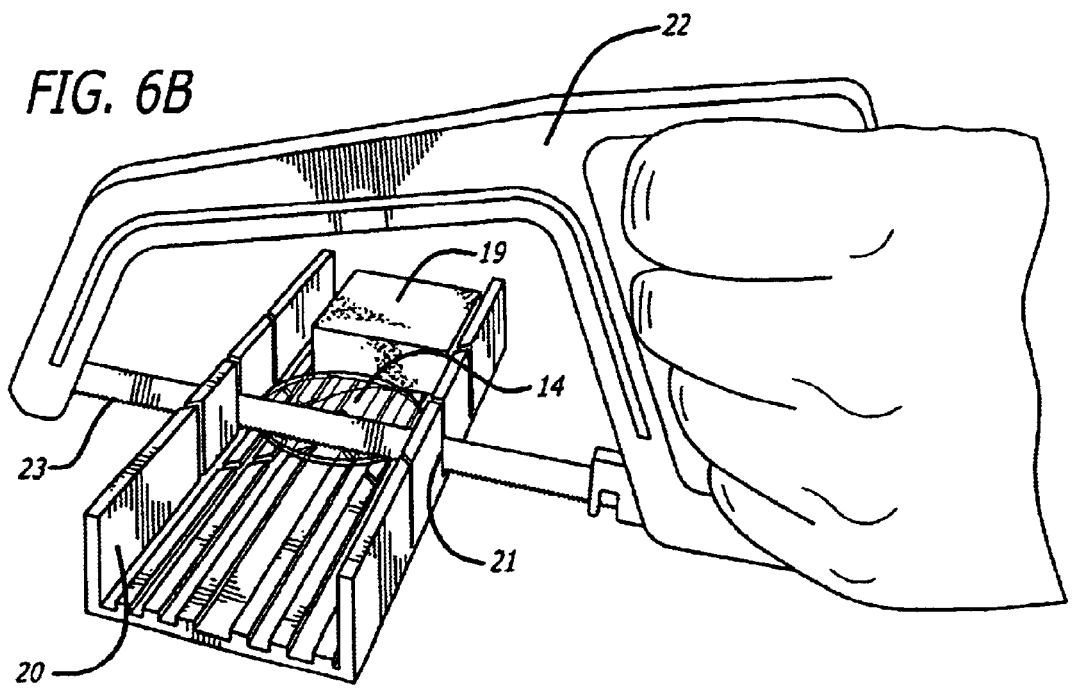
FIG. 6B is a top view of the mitre box of FIG. 6A showing lines along which the 180 degree line on a lens blank is aligned.
Figure 6A:
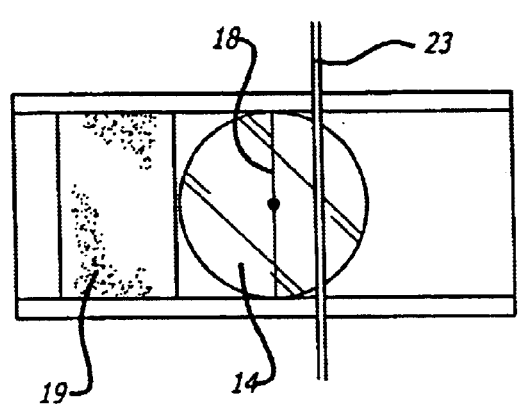
FIG. 6A illustrations using a mitre box to cut a lens blank.

FIG. 6A is a top view of a miter box assembly. The marked lens is placed against a pad 19, and the 180 degree line previously marked on the protractor is lined up with a line on the miter box 20 (not shown). The miter box 20 includes a slot 21 for the saw blade 23 and, when the blade cuts the lens across the slot, the proper upper portion of the lens is cut off, as in FIG. 7. FIG. 6B illustrates a perspective view of using a miter box 20 to cut a lens blank.

Again, the mitre box 20 has slots such as 21 at which a simple hand saw 22 may be inserted to cut the lens. When the 180 degree line across the lens is aligned with a mark on the miter box, the blade of the saw will cut off a portion of the top of the lens spaced a distance from the 180 degree line. In one example, the 180 degree line is drawn across the lens where the diameter of the lens is 44 mm. The line 18 is then cut at a position where the line 18 extends 38 mm across the lens. Of course, this is just one example and other arrangements are possible.

Figure 7:
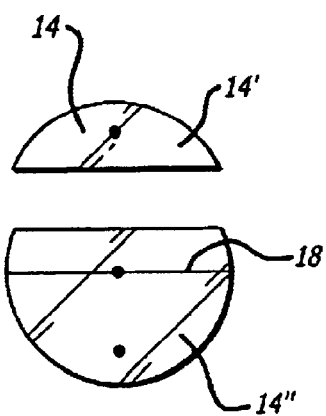
FIG. 7 illustrates a cut lens blank.

FIG. 7 illustrates a cut lens blank 14, which has been cut across the top portion 14' of the lens. The 180 degree line that was marked in the protractor of FIG. 4 appears on the lens. After cutting, the 180 degree line can be washed off as the lens is cleaned. The bottom portion of the lens 14" of FIG. 7 is now ready for mounting in the frame.

Figure 8:
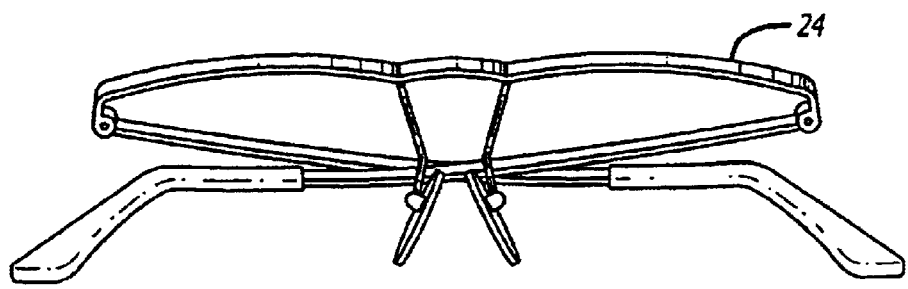
FIG. 8 illustrates a standard glasses frame.

FIG. 8 illustrates a standard glasses frame 24. Adult and child versions of the same frame design may be provided. The frame could be any of a variety of materials, such as metal or plastic, for example. The frames typically include a straight bar onto which the lenses are mounted. The lenses may be mounted with a strong adhesive, for example, or with two-sided tape, which is also known as transfer tape. Strong adhesives and strong two-sided tapes are known in the art.

Figure 9:
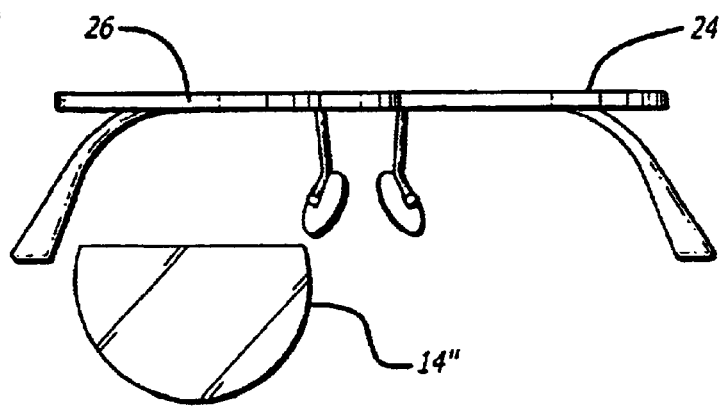
FIG. 9 illustrates the cut lens and the glasses frame.

FIG. 9 illustrates the frame 24 and a separate, cut bottom portion 14" of the lens. The frame 24 typically has a relatively straight bar 26 across the top to receive the cut lens. The bar 26 may be curved slightly to accommodate the curvature of the lens. The adhesive or double-sided tape is typically applied across the top of the lenses, which are then adhered to the frame.

Figure 10:
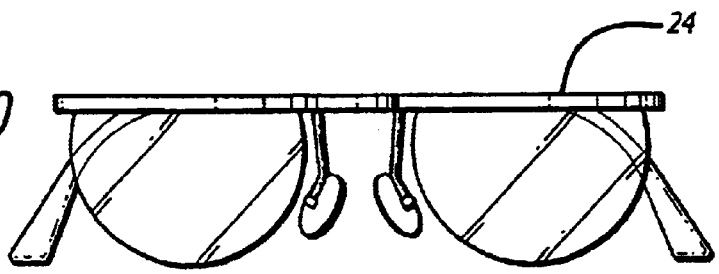
FIG. 10 illustrates the glasses after the lenses have been adhered to the frames.
Figure 11:
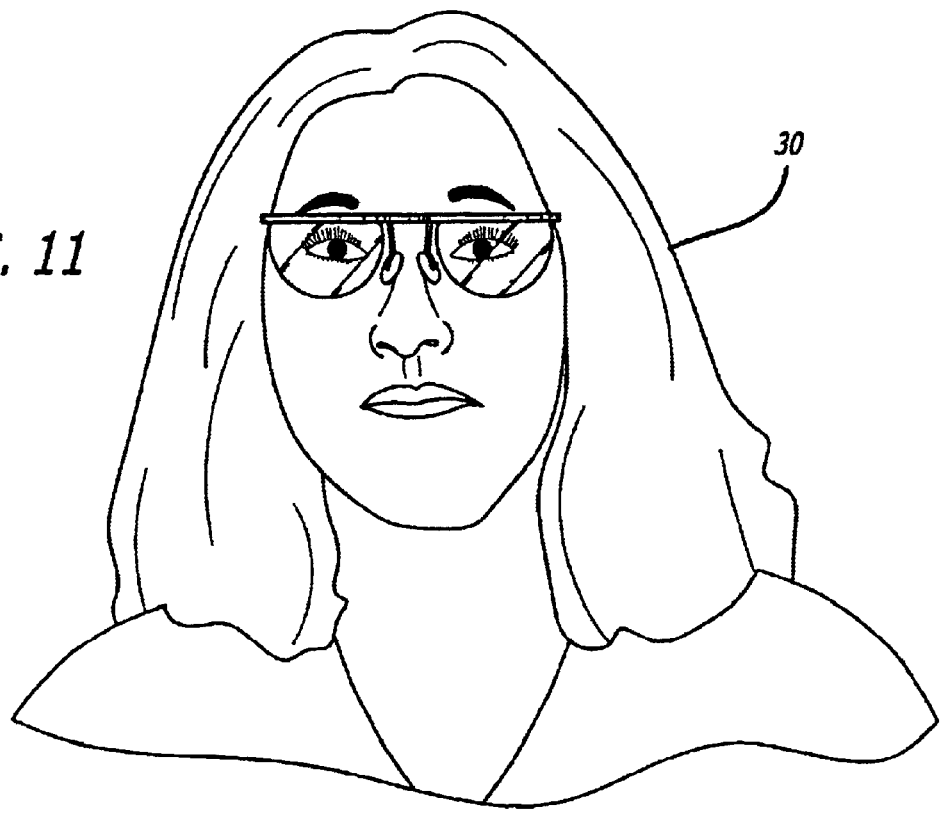
FIG. 11 illustrates the end-user wearing a pair of glasses made according to the present invention.

FIG. 10 illustrates a front view of the glasses after the lenses have been adhered or taped to the frames. FIG. 11 illustrates the end-user 30 wearing a pair of glasses made according to the present invention.

While the specification describes particular embodiments of the present invention, those of ordinary skill can devise variations of the present invention without departing from the inventive concept. For example, a bifocal can be made easily by placing a bifocal wafer of the desired power at the proper height and lateral decentration for the near pupillary distance. The bifocal wafer may be adhered with capillary attraction or a suitable glue to the previously fabricated distance correction. The seg height and decentration can be varied for each eye, enabling the most precise correction possible.

I claim:

1. A method of fabricating eye glasses comprising the steps of:
   measuring the interpupillary distance of each eye;
   measuring the refractive error of each eye with a hand-held auto refractor;
   selecting a proper lens blank for each eye from among a stock of lenses;
   cutting across and removing a portion of a lens for each eye along a line segment; and
   after cutting the lenses, mounting the cut lenses onto an eyeglasses frame, said lenses having a portion removed therefrom by said step of cutting.

2. The method according to claim 1, further comprising the step of applying a bifocal segment to both of the lenses.

3. The method according to claim 2, wherein the bifocal segment is applied to the lenses by use of capillary attraction.

4. The method according to claim 2, wherein the bifocal segment is applied to the lenses with glue.

5. The method according to claim 2, wherein the bifocal segment is applied to the lenses with transfer tape.

6. A method as defined in claim 1, wherein the interpupillary distance is measured with a simple P.D. rule.

7. A method as defined in claim 1, wherein the lenses are mounted onto the frame with glue.

8. A method as defined in claim 7, wherein the glue is a quick-setting glue.

9. The method according to claim 1, wherein the bifocal segment is applied to the lenses with transfer tape.

10. A method as defined in claim 1, wherein the lenses are mounted onto the frame with adhesive.

11. A method as defined in claim 1, wherein the lenses are cut in a miter box.

12. A method as defined in claim 1, wherein the refractive error of each eye is measured with a hand-held autorefractor.

13. A method as defined in claim 1, wherein the lenses are marked with a protractor prior to cutting.

14. A method as defined in claim 13, wherein the markings on the lenses are cleaned off after the step of cutting the lens.

15. A method of fabricating eye glasses comprising the steps of:

measuring the interpupillary distance of each eye;

measuring the refractive error of each eye with a hand-held auto refractor;

selecting a proper lens blank for each eye from among a stock of lenses, each lens having a prescribed axis;

aligning a prescribed axis on a protractor;

marking a line across the lens at the 180 degree line using a protractor;

matching the line marked across the lens to a mark in a miter box;

sawing off a portion of a lens for each eye in the miter box; and mounting the cut lenses onto an eyeglasses frame.

* * * * *